United States Patent [19]

Suwa et al.

[11] Patent Number: 5,371,556
[45] Date of Patent: Dec. 6, 1994

[54] SPECTACLE TYPE RETINA DIRECT DISPLAY APPARATUS

[75] Inventors: Hisashi Suwa; Seizi Sato, both of Kanagawa, Japan

[73] Assignee: Sony Corporation, Tokyo, Japan

[21] Appl. No.: 993,457

[22] Filed: Dec. 15, 1992

Related U.S. Application Data

[63] Continuation of Ser. No. 641,495, Jan. 15, 1991, abandoned.

[30] Foreign Application Priority Data

Jan. 19, 1990 [JP] Japan ................................. 2-8178

[51] Int. Cl.⁵ .............................................. G02C 1/00
[52] U.S. Cl. ..................................... 351/158; 351/243; 348/51
[58] Field of Search .................. 351/158, 243; 358/88, 358/92, 241, 236, 237

[56] References Cited

U.S. PATENT DOCUMENTS

| | | |
|---|---|---|
| 4,636,866 | 1/1987 | Hattori . |
| 4,706,117 | 11/1987 | Schoolman . |
| 4,805,988 | 2/1989 | Dones ................................. 358/88 |
| 4,933,755 | 6/1990 | Dahl et al. ........................... 358/88 |
| 4,952,024 | 8/1990 | Gale .................................... 358/88 |
| 5,129,716 | 7/1992 | Holakovszky et al. ............. 351/158 |

FOREIGN PATENT DOCUMENTS 1103961  4/1961  Germany ..................... H04N 5/64

OTHER PUBLICATIONS

Karl Mutze, Leonhard Foitzik, Wolfgang Krug, and Gunter Schreiber, "ABC der Optik," Verlag Werner Dausien, Hanau, Germany, 1972, pp. 540-542.

*Primary Examiner*—William L. Sikes
*Assistant Examiner*—Hung Xuan Dang
*Attorney, Agent, or Firm*—Limbach & Limbach

[57] ABSTRACT

A display apparatus for displaying a visual image to retina directly is comprised of an eye lens, a transparent display panel on which a picture image is displayed, a point source of light, and a mirror for reflecting a light which is emitted from the point source of light through the display panel to the eye lens to focus a real image on the user's retina.

7 Claims, 5 Drawing Sheets

SPECTACLE TYPE RETINA DIRECT DISPLAY APPARATUS

This is a continuation of co-pending application Ser. No. 07/641,495 filed on Jan. 15, 1991, now abandoned.

BACKGROUND OF THE INVENTION

1. Field of the Invention

The present invention generally relates to a display apparatus and, more particularly, to a spectacle type retina direct display apparatus in which a video image is directly projected onto the retinas of both eyes and displayed thereon.

2. Description of the Prior Art

Most video information is generally displayed on a monitor TV (television) receiver or on a screen, and a real image thereof is projected onto the viewer's retinas through the eyeballs, thereby being perceived by the viewer.

According to the above-described video apparatus, however, the monitor screen surface is projected onto one portion of the retina so that the displayed image is not so powerful for the viewer. For this reason, a monitor TV receiver and a screen projection apparatus of a large picture screen are widely utilized. It is, however, unavoidable that these systems need a large-scale video apparatus and a wide video space.

As one of the methods for obtaining a powerful large picture in a relatively small video space, a TV display apparatus of a spectacle type is proposed as disclosed, for example, in Japanese Laid-Open Utility Model Gazette No. 48-16726.

This display system is a magnifying glass system in which an image is magnified by an optical system and a virtual image is viewed by the viewer. In this system as shown in FIG. 1, a light output from an image A–B is enlarged by a lens 1 and projected onto a retina 3 through a crystalline lens 2, but the image perceived at that time is a virtual image as shown by A'–B' in FIG. 1.

As a consequence, if the magnifying ratio of the lens 1 is increased, an aberration causes a blur to occur in which the peripheral portion of the image becomes out of focus, thus considerably depriving the picture of the power.

Further, the eyesight adjustment for matching the apparatus with viewers becomes indispensable. If the display apparatus of this type is utilized for a long period of time after the adjustment of eyesight, the eye's muscles are extremely fatigued because the focal point of the crystalline lens 2 must be adjusted.

A real image system of the prior art to which the present invention is applied will be explained next with reference to FIG. 2.

As shown in FIG. 2, an optical system of this real image system is fundamentally comprised of a point-source of light 11, an image plate 12 illuminated by this point-source of light 11 and an eye lens 13 of a short focal length located to become substantially one body with the image plate 12. According to this arrangement, an image is projected by the above-mentioned optical system onto a retina 15 as a real image as shown in FIG. 2.

Particularly, in the case of both eyes, the adjustment of a distance between pupils is further required so that, even when the above apparatus is formed as a spectacle type, the apparatus becomes large in size and complicated in arrangement.

OBJECTS AND SUMMARY OF THE INVENTION

Accordingly, it is an object of the present invention to provide an improved display apparatus for displaying a visual image to retina directly in which the aforenoted shortcomings and disadvantages encountered with the prior art can be eliminated.

More specifically, it is an object of the present invention to provide a display apparatus for displaying a visual image to a retina directly in which a frame of eye-glasses can be made compact in size.

It is another object of the present invention to provide a display apparatus for displaying a visual image to a retina directly in which a consumption of power can be reduced.

It is still another object of the present invention to provide a display apparatus for displaying a visual image to a retina directly which can be utilized in a wide variety of situations, such as when the viewer wears this apparatus while walking.

It is a further object of the present invention to provide a display apparatus for displaying a visual image to retina directly in which attachments for eyeballs thereof can be prevented from being displaced when in use.

According to an aspect of the present invention, a display apparatus for displaying a visual image to retina directly is comprised of an eye lens, a transparent display panel on which a picture image is displayed, a point source of light, and a mirror for reflecting a light which is emitted from the point source of light through the display panel to the eye lens.

The above, and other objects, features and advantages of the present invention will become apparent from the following detailed description of illustrative embodiments to be taken in conjunction with the accompanying drawings, in which like reference numerals are used to identify the same or similar parts in the several views.

DETAILED DESCRIPTION OF THE PREFERRED EMBODIMENTS

An embodiment of a display apparatus for displaying a visual image to retina directly according to the present invention will now be described in detail with reference to the drawings.

Figure 3:
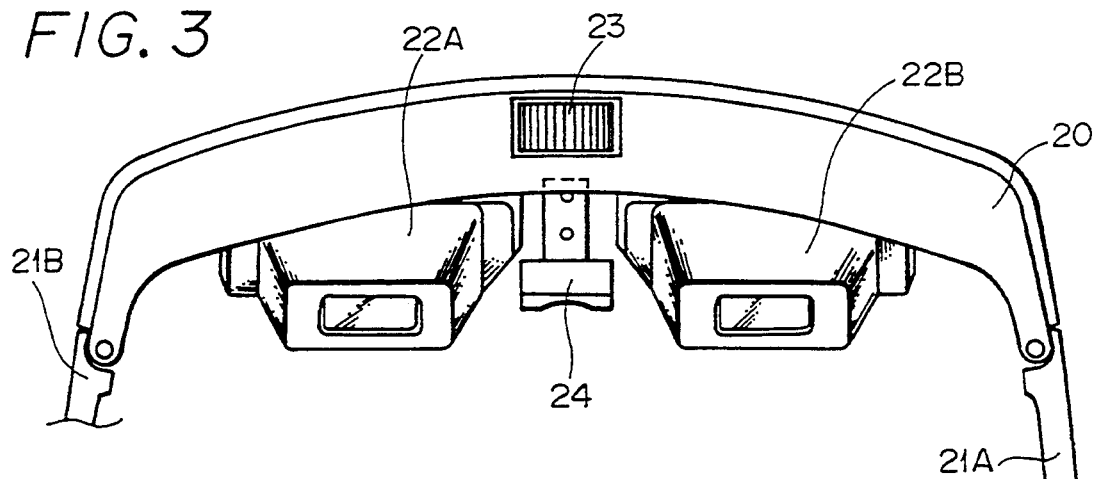
FIG. 3 is a top view illustrating an embodiment of a spectacle type retina direct display apparatus according to the present invention.
Figure 4:
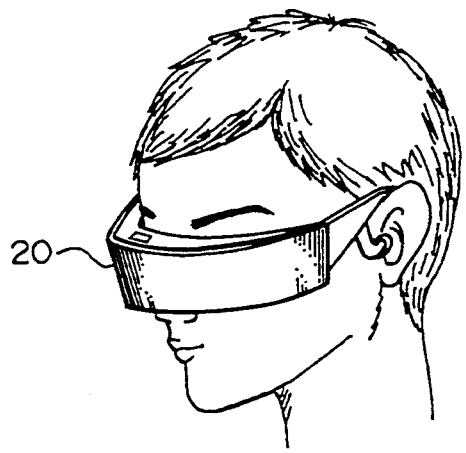
FIG. 4 is an explanatory diagram showing the condition such that the viewer wears the spectacle type retina direct display apparatus of the present invention.

FIG. 3 is a top view illustrating an embodiment of a spectacle type retina direct display apparatus according to the present invention and the condition that the viewer wears such apparatus is represented in FIG. 4.

In FIG. 3, reference numeral 20 depicts a front frame to which main portions of the spectacle type retina direct display apparatus are secured. This front frame has support frames 21A and 21B provided rotatable at its left and right sides to support this frame 20 on the viewer's face.

Reference numerals 22A and 22B depict attachments for each eyeball in which image plates, eye lenses and mirror planes are accommodated as will be mentioned later.

The attachments 22A and 22B for the eyeballs are moved apart left and right by turning a space adjusting dial 23 mounted on the frame 20 so that the relative positions thereof can become identical with a space between the pupils.

Reference numeral 24 depicts a central supporting portion or central supporter by which the frame 20 is put on the viewer's nose, and this central supporter 24 accommodates therein a lamp which becomes a point-source of light and a condenser lens for converging and transmitting the light emitted from this lamp to the left and right attachments 22A, 22B for eyeballs.

Reference numeral 25 depicts a rotating lever provided at the point near the end portion of each of the supporting frames 21A and 21B, and this rotating lever 25 has at a top thereof an earphone 26 which is fitted into an auditory opening.

Lead wire of the earphone 26, lead wire for supplying a video signal and so on are not shown.

Upon use, such spectacle type retina direct display apparatus is worn by the viewer similarly to the standard spectacles as shown in FIG. 4 and displays an image supplied thereto in the form of an electrical signal as powerfully as the large picture screen does as will be referred to later.

Figure 5:
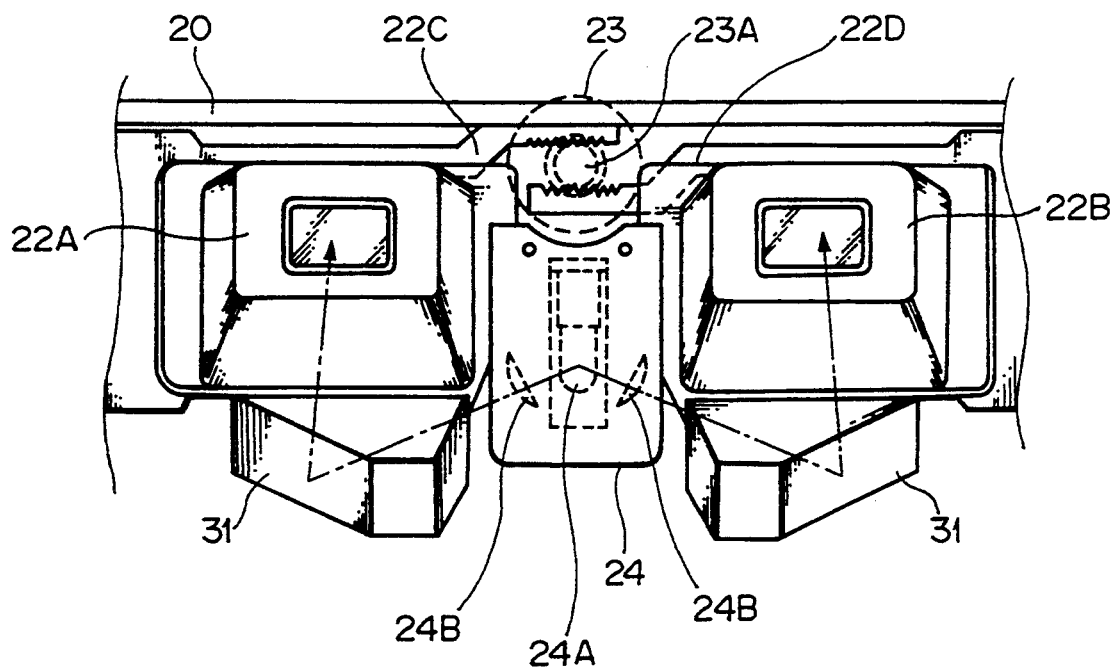
FIG. 5 is a front view illustrating a main portion of the spectacle type retina direct display apparatus according to the present invention.

FIG. 5 shows the spectacle type retina direct display apparatus of FIG. 3 from the side of viewer's face.

When the space adjusting dial 23 mounted on the frame 20 is rotated, racks 22C and 22D meshed with a gear 23A of the dial 23 are moved right and left, thereby the space between the attachments 22A and 22B for eyeballs being adjusted.

Preferably a tungsten lamp 24A is detachably provided within the central supporting portion 24 as the point-source of light.

As the tungsten lamp 24A, there can be utilized other light sources so long as they become point-source of lights.

Reference numerals 24B and 24B respectively depict condenser lenses which are used to effectively transmit the light emitted from the tungsten lamp 24A to the left and right attachments 22A and 22B for eyeballs.

Figure 6:
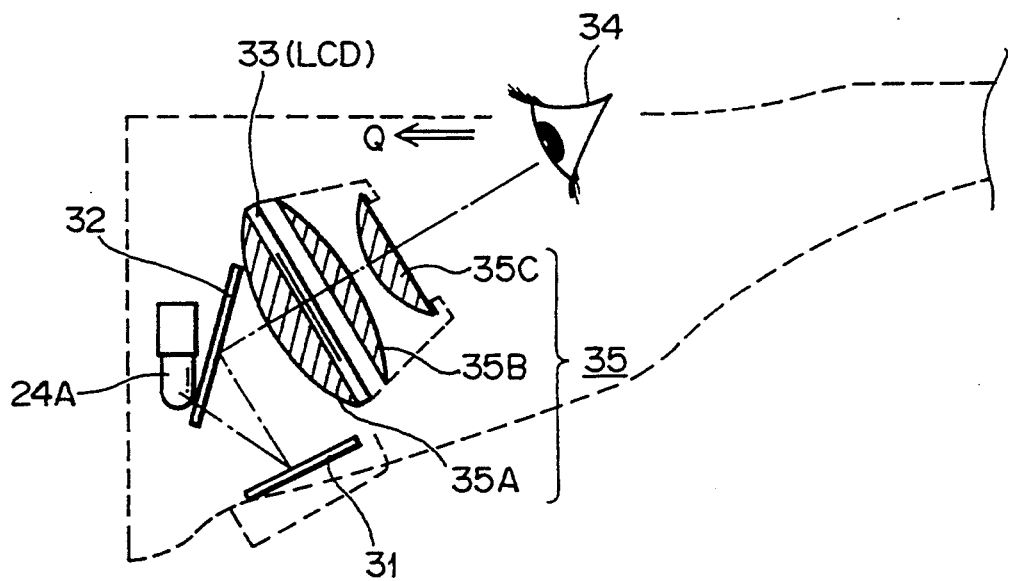
FIG. 6 is a schematic diagram used to explain an optical system of an attachment for eyeball of the spectacle type retina direct display apparatus according to the present invention.

As best shown in FIGS. 5 and 6, the light beams travel through the condenser lenses 24B and 24B and are, as shown by dashed lines, reflected by first mirror planes 31 each accommodated within the left and right attachments 22A and 22B for eyeballs, then reflected by second mirror planes 32 and passed through transparent type image plates 33, thereby reaching to the eyeball through eye lenses 35, respectively, as will be described later.

Accordingly, the light from the point-source of light can be effectively utilized by two optical systems so that the consumption of power can be reduced.

As shown in FIG. 6, the light emitted from the tungsten lamp 24A located in the direction perpendicular to the sheet of drawing is reflected by the first mirror 31 located at the lower side of each of the attachments 22A and 22B and then reflected by the second mirror 32 located in front of each of the attachments 22A and 22B as shown by a broken line. Then, the reflected light travels through the image plate 33 formed of a liquid crystal display (LCD) plate and reaches an eyeball 34. Reference numerals 35A, 35B and 35C depict three eye lenses and these lenses function to focus the light traveled through the image plate 33 on the pupil portion on the surface of the eyeball 34.

Preferably, the image plate 33 is formed of a transparent type liquid crystal plate having a color filter and is driven by a video signal supplied from a display drive circuit that is employed in a liquid crystal television receiver.

Figure 1:
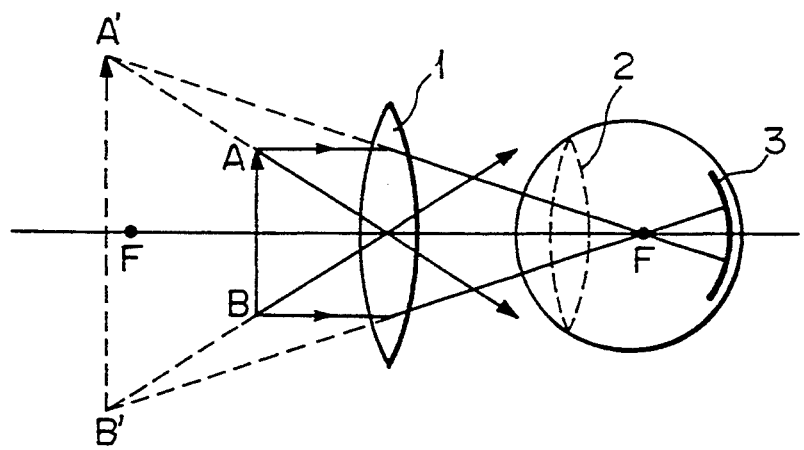
FIG. 1 is an explanatory diagram showing an outline of a conventional display apparatus of virtual image system.
Figure 2:
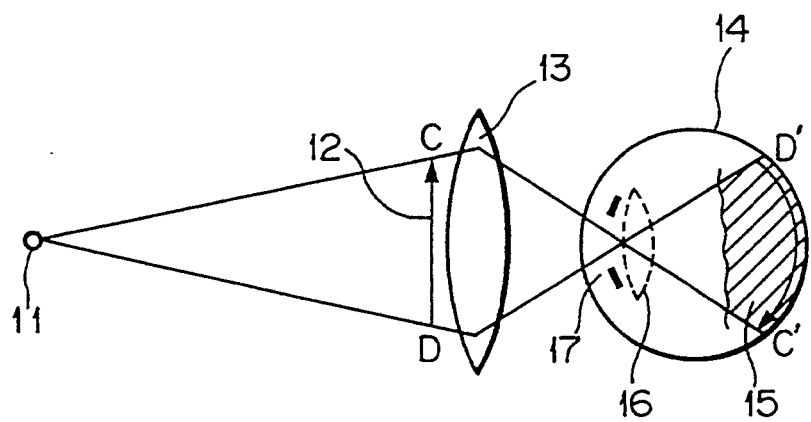
FIG. 2 is a schematic diagram of a principle of a real image system and illustrating a prior art of the present invention.

The eye lenses 35 (35A, 35B and 35C) function to focus the light on the pupil 17 on the crystalline lens 16 of the eyeball 14 as shown in FIG. 2, which was earlier referred to, and utilizes this focal point as a pinhole so that, even when the real image on the image plate 33 is inverted, the image is focused on the retina 15.

Accordingly, if the spectacle type retina direct display apparatus of the present invention is utilized so that the pupil is located at the focal point of the eye lens, regardless of viewer's eyesight (near-sighted and far-sighted), the viewer can clearly perceive only the image on the image plate 33. In addition, a visual angle of image light incident on the eyeball can be increased to about 60 degrees so that the viewer can enjoy a displayed picture as though to watch a powerful large picture at a very short distance.

Further, since the line of sight of the eye lens is slightly lowered from the line of sight Q in the horizontal direction of the eyeball 34 (see FIG. 6), the viewer can see the front while wearing the spectacle type retina direct display apparatus of the present invention, which can improve the portability of the apparatus of the present invention.

The eye lens which satisfies the aforesaid conditions may be such one that is formed of two lenses or single element lens so long as the eye lens provides a predetermined focal length (about 20 mm).

Figure 7:
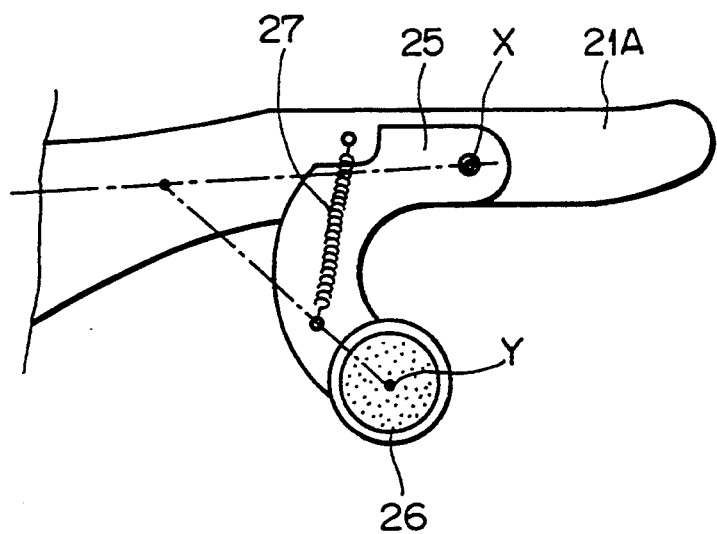
FIG. 7 is a side view of a rotating lever which supports an earphone of the spectacle type retina direct display apparatus according to this invention.

FIG. 7 shows the position of the rotating lever 25 mounted on each of the supporting frames 21A and 21B.

The rotating lever 25 has at its top the earphone 26 which is fitted into the auditory opening, and the rotating lever 25 is preferably spring-biased by a spring 27 in the counter-clockwise direction in FIG. 7.

With the above-mentioned arrangement, when the viewer wears the frame 20 on his face with the supporting frames 21A and 21B put on the ears and fits the earphones 26 into auditory openings simultaneously, the supporting frames 21A and 21B support the load of the frame 20 at two points X and Y as shown by one-dot chain lines in FIG. 7.

As a consequence, it is possible to prevent the frame 20 from being slipped down from the nose due to the weights of the attachments 22A and 22B for eyeballs.

Figure 8A:
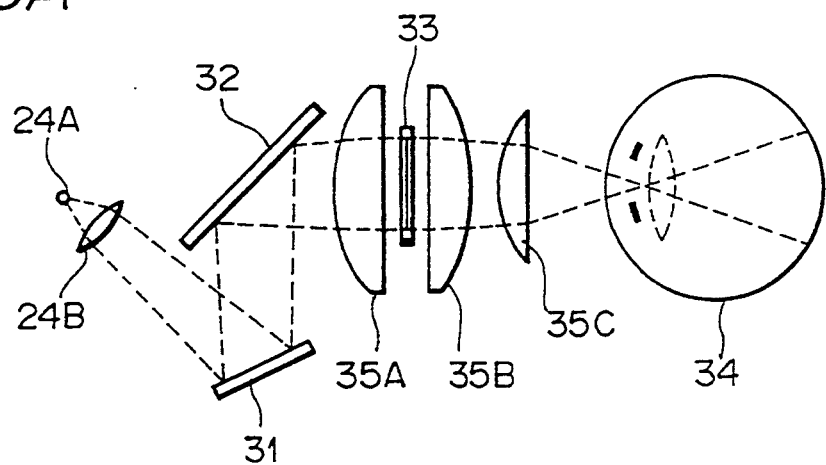
FIGS. 8A, 8B and 8C are explanatory diagrams showing other embodiments of the optical system of the spectacle type retina direct display apparatus according to the present invention, respectively.
Figure 8B:
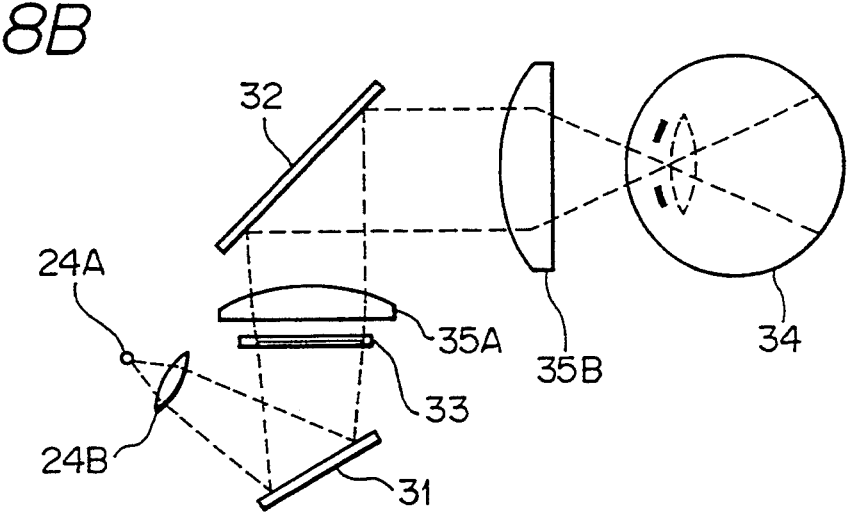
Figure 8C:
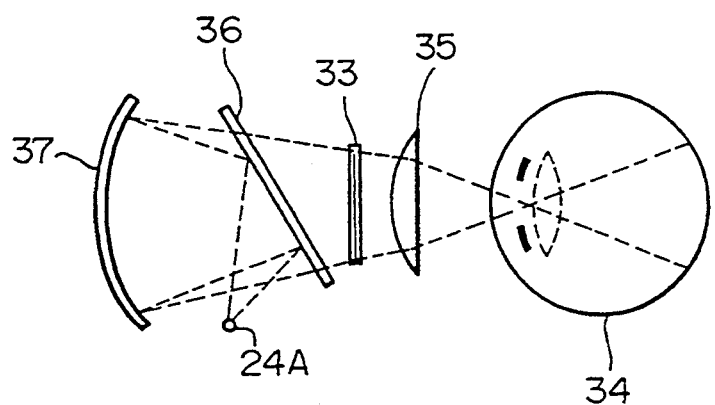

FIGS. 8B and 8C respectively show other examples of the mirror, lens and image plates which are accommodated within each of the attachments 22A and 22B for eyeballs.

In the embodiment shown in FIG. 8B, the light reflected on the first mirror 31 is directly traveled through the image plate 33. This light is reflected on the second mirror 32 through the first lens 35A and traveled through the second eye lens 35B to the eyeball 34.

In the embodiment shown in FIG. 8C, the light from the point-source of light 24A is reflected on the first reflection plate 31 and is then reflected toward a concave mirror 37 side by a half mirror 36. A light reflected by the concave mirror 37 is traveled through the image plate 33 and the eye lens 35 to the eyeball 34.

While the above-mentioned embodiments become useful for miniaturizing the spectacle type retina direct display apparatus of the present invention because the light emitted from the point-source of light becomes incident on the eye lens regardless of the short dimension of the apparatus, the optical systems of the present invention are not limited thereto and other optical systems may be utilized.

Incidentally, it is needless to say that a stereoscopic picture may be obtained by supplying a stereoscopic video signal to the left and right image plates 33.

As described above, according to the spectacle type retina direct display apparatus of the present invention, when the video picture illuminated by the point-source of light is focused on the retinas of eyeballs and the viewer can see the real image of the video picture with both eyes, the light incident on both eyes can be obtained from one light source. Thus, the frame of the spectacle can be made compact in size and also, the power consumption can be reduced.

Further, since the line of vision of the optical system opposing to the eyeball is slightly lowered from the line of vision in the horizontal direction of the eyeball, the viewer can feel the external situations while wearing the spectacle type retina direct display apparatus of the present invention. Therefore, this apparatus can be utilized in a wide variety of situations, such as when the viewer can wear this apparatus while walking.

Furthermore, the supporting of the spectacle type retina direct display apparatus is reinforced by the rotating levers inserted into the auditory openings so that, when this apparatus is in use, the attachments for eyeballs can be prevented from being displaced effectively.

Having described preferred embodiments of the invention with reference to the accompanying drawings, it is to be understood that the invention is not limited to those precise embodiments and that various changes and modifications thereof could be effected by one skilled in the art without departing from the spirit or scope of the novel concepts of the invention as defined in the appended claims.

We claim as our invention:

1. A display apparatus for displaying a visual image through a crystalline lens in a user's eyeball to a retina of the user of the display apparatus comprising:
   a) a lens means;
   b) a transparent display panel on which a picture image is displayed;
   c) a point source of light;
   d) a mirror means for reflecting a light which is emitted from the point source of light through the display panel to the lens means and wherein the lens means has a focal point at the pupil of an eye of the user so that the picture image on the display screen is focussed on the crystalline lens of the user's eyeball which focusses the picture image on the user's retina; and
   e) wherein the point source of light is a single point source of light and further comprising a pair of lens means, a pair of transparent display panels, a pair of mirror means, and a frame shaped like eye-glasses for supporting the pair of lens means, the pair of transparent display panels, the point source of light and the pair of mirror means, and further including means for adjustably spacing apart the pair of lens means, the pair of transparent display panels, and the pair of mirror means to accommodate different spacings between the eyeballs of different users.

2. A display apparatus for displaying a visual image according to claim 1, wherein the light emitted by the single point source of light is utilized by each lens means individually.

3. A display apparatus for displaying a visual image according to claim 2, wherein the single point source of light is located between a position of a left eye and a position of a right eye of the user of the display apparatus.

4. A display apparatus for displaying a visual image according to claim 1, wherein an imaginary axis passed through the center of the lens means is directed to a lower angle than a horizontal line.

5. A display apparatus for displaying a visual image according to claim 1, further comprising arm means connected to the frame which is attached to an auditory opening of an ear of the user of the display apparatus to support the frame.

6. A display apparatus for displaying a visual image according to claim 5, wherein the arm means have loudspeakers to reproduce an audio signal.

7. A display apparatus for directly displaying a visual image to a retina of a user of the display apparatus comprising:
   a) lens means having a predetermined focal length of about 20 mm;
   b) a transparent display panel on which a picture image is displayed;
   c) a point source of light; and
   d) mirror means for reflecting a light which is emitted from the point source of light through the transparent display panel to the lens means and wherein the lens means focuses the picture image on the retina of the user of the display apparatus.

* * * * *